(12) United States Patent
Davis (10) Patent No.: US 6,718,517 B1
(45) Date of Patent: Apr. 6, 2004

(54) METHODS OF AND COMPUTER READABLE MEDIA FOR AUTOMATICALLY SETTING UP PAGE FILES FOR LABELS FOR COMPACT DISC MEDIA

(75) Inventor: Kenneth P. Davis, Brighton, CO (US)

(73) Assignee: Roxio, Inc., Milpitas, CA (US)

( * ) Notice: Subject to any disclaimer, the term of this patent is extended or adjusted under 35 U.S.C. 154(b) by 0 days.

(21) Appl. No.: 09/473,916

(22) Filed: Dec. 28, 1999

(51) Int. Cl.[7] .............................................. G06F 17/21
(52) U.S. Cl. ...................................... 715/526; 715/517
(58) Field of Search ................................ 715/526, 517, 715/520, 521

(56) References Cited

U.S. PATENT DOCUMENTS

| | | | | |
|---|---|---|---|---|
| 5,568,571 A | * | 10/1996 | Willis et al. ................. | 382/254 |
| 5,784,487 A | * | 7/1998 | Cooperman ................. | 382/175 |
| 5,915,858 A | * | 6/1999 | Wen ............................ | 400/61 |
| 6,018,593 A | * | 1/2000 | Yamagata ................... | 382/201 |
| 6,327,048 B1 | * | 12/2001 | Wen ........................... | 358/1.18 |
| 6,549,680 B1 | * | 4/2003 | Revankar .................... | 382/289 |

\* cited by examiner

Primary Examiner—Stephen S. Hong (74) Attorney, Agent, or Firm—Martine & Penilla, LLP (57) ABSTRACT

Methods and computer readable media generate a page file representing a compact disc label sheet having label blanks thereon for one or both of a compact disc case or a compact disc. The sheet may have a label for one or both of the compact disc case and the compact disc. The method provides such sheet, wherein the sheet supports the labels at any of a plurality of locations. The sheet with the labels supported at particular locations define a particular geometric layout configuration. One or more images may also be on the sheet. Operations of the method optically accent the particular configuration, and then scan the optically accented configuration to generate a digital representation of the sheet. All of the images are then excluded from the digital representation so that the remaining digital representation represents only the labels. The remaining digital representation is analyzed to determine the location on the sheet of the labels. A new page file is created to represent the compact disc label sheet having the labels. The page file includes data as to the location on the sheet of the labels. Using the method, and computer readable media having program instructions for performing the method, a user may buy such sheets for which the user's label printing software has no corresponding page file, yet the user need not manually measure the locations of the labels that are on the purchased new sheet to provide label location data, and the user need not enter any label location data into a page file provided by the software.

12 Claims, 8 Drawing Sheets

[ PAGE FILE 1.INI ]

**\*View 1 = Disc**

Left Edge Offset = 2 cm.
  Top Edge Offset = 3.3 cm.
  Inner Radius = 2.05 cm.
  Outer Radius = 5.55 cm.

**\*View 2 = Rectangle**

Top Edge Offset =3.3.cm.
  Right Edge Offset = 1.75 cm.
  X dimension = 5 cm.
  Y dimension = 30 cm.

**\*View 3 = Rectangle**

Top Edge Offset =3.73 cm.
  Right Edge Offset = 1.75 cm.
  X dimension = 5 cm.
  Y dimension = 30 cm.

**\*View 4 = Disc**

Left Edge Offset = 4 cm.
  Top Edge Offset = 37 cm.
  Inner Radius = 2.05 cm.
  Outer Radius = 5.55 cm.

METHODS OF AND COMPUTER READABLE MEDIA FOR AUTOMATICALLY SETTING UP PAGE FILES FOR LABELS FOR COMPACT DISC MEDIA

BACKGROUND OF THE INVENTION

1. Field of the Invention

This invention relates generally to computer systems, and more particularly to methods and computer readable media for generating a page file representing a compact disc label sheet having a blank label thereon for one or both of a compact disc case or a compact disc, wherein the page file may be used to generate a custom label for the compact disc case or the compact disc.

2. Description of the Related Art

In recent years, compact disc (CD) recording technology has made substantial advancements that have enabled casual computer users to digitally record all types of data on CD media. As is well known, for example, MP3 tracks may be downloaded into computer storage, and then written onto new blank CD media supplied by the computer user. The user thereby makes CDs having customized musical or other data recorded thereon.

Having recognized advantages of having customized labels available for such users to attach to their custom CD media, label vendors have supplied CD label sheets for purchase by such users. Such CD label sheets are generally two dimensional pieces of material that support one or more labels, such as labels for CD cases that protect the CDs, or labels for the CDs themselves. Such labels are generally unprinted, i.e., they are blank labels (i.e., devoid of any marking) so that the user may provide custom text or designs on the blank labels. The pieces of material may support the blank labels at any of various locations on the pieces of material. The particular location(s) at which the one or more blank labels are supported on a given piece of material may be referred to as a "geometric layout configuration." Each of the vendor-supplied pieces of material may also have vendor-printed indicia thereon, such as icons, printed logos or text, for example. Such vendor-printed indicia are not printed within the perimeters of the blank labels, and may be referred to as "non-geometric configurations." Such vendor-printed indicia are different from the label blanks for the CD cases or CDs in that generally the user does not add any indicia to the vendor-printed indicia.

The CD blank labels that may be provided on the CD label sheets are generally two dimensional blanks of material. Each such blank label is removably supported on the CD label sheet, such as by having a self-stick adhesive on the back thereof. The CD label sheet has a coating of material from which the self-stick adhesive is easily removable. The blank label may have any one of various geometric shapes, and is adapted to receive information in the form of printing media, such as printer toner. Such information may, for example, be customizing information selected by the user for a customized label. The perimeter of a particular blank label may be defined by scoring or another type of cut that separates the perimeter of the particular blank label from the rest of a two dimensional piece of material on the CD label sheet surrounding the blank label.

In the past, users have purchased such CD label sheets with the blank labels described above. Such users have tried to use currently available software to operate computer printers (label printing software) to print on such blank labels. However, such label printing software is generally sold with only a few page files corresponding to CD labels, or case labels, that were available at the time the label printing software was designed. The software vendor will have known the exact various locations of the blank labels on the then-available CD labels sheets. Therefore, for a known label sheet, the corresponding page file included with the label printing software enables appropriate commands to be given to print onto the locations on the CD label sheet at which the blank labels are located.

In the past, when the user has purchased CD label sheets for which the label printing software has no corresponding page file ("new" CD label sheets), the user has had to manually measure the locations of the blank labels that are on the purchased new CD label sheet to provide label location data. The label location data has then been entered by hand into a new page file in the label printing software. It may be understood that in addition to being a very time-consuming process, such manual measurement is often erroneous, and even if accurate, the manual entering of such label location data into the page file may result in errors. In any event, the need to make such measurements very accurately, and the need to be very accurate in performing such data entry, have significantly detracted from the usefulness of such label printing software.

In view of the foregoing, there is a need for computer-implemented methods, and computer readable media, to automatically generate page files representing various new compact disc label sheets having blank labels thereon for one or both of a compact disc case or a compact disc, wherein the page files may be used to generate custom labels for the compact disc cases or the compact discs.

SUMMARY OF THE INVENTION

Broadly speaking, the present invention fills these needs by providing methods and computer readable media for generating a page file representing a compact disc label sheet having a blank label thereon for one or both of a compact disc case or a compact disc, wherein the page file may be used to generate a custom label for the compact disc case or the compact disc. It should be appreciated that the present invention can be implemented in numerous ways, including as a process, an apparatus, a system, computer readable media, or a device. Several inventive embodiments of the present invention are described below.

In one embodiment, a method for generating a page file representing a compact disc label sheet is disclosed. The label sheet may have at least one blank label thereon for one or both of a compact disc case and a compact disc. The method begins by providing the compact disc label sheet having one, for example, of the blank labels thereon. The sheet may support the blank label at any of a plurality of locations on the sheet. The sheet with the blank label supported at a particular location may be said to define a particular geometric layout configuration. The sheet may also have at least one image thereon in addition to the one exemplary blank label. The method continues by optically accenting the particular geometric layout configuration, and then scanning the optically accented particular geometric layout configuration to generate a digital representation of the compact disc label sheet having the exemplary one of the blank labels thereon. Then, all of the images are excluded from the digital representation of the compact disc label sheet so that the remaining digital representation represents only the exemplary one of the blank labels. The remaining digital representation is analyzed to determine the location on the sheet of the exemplary label. A new page file is then created to represent the compact disc label sheet having the exemplary one blank label thereon. The page file includes data as to the location on the sheet of the exemplary one blank label.

In another embodiment, a method is provided for adding to a list of paper label templates a page file representing a new CD label sheet. The CD label sheet may have at least one CD blank label thereon, such as an exemplary two blank labels. The method may begin by automatically analyzing the new CD label sheet to provide data representing the layout of the exemplary two blank labels on the sheet. A new .INI file is generated. The data is inserted into the new .INI file; and the new .INI file is appended to the list of paper label templates so that a user may create labels using the blank labels on the new CD label sheets.

In still another embodiment, a method is provided for converting a digital representation to a page file. The digital representation represents a CD label sheet having at least one CD blank label and at least one image thereon in addition to the at least one CD blank label. For example, three CD blank labels and one image (a logo, for example), may be provided. The method may begin by excluding from the digital representation of the CD label sheet all of the images thereon, so that one image is excluded. In this manner, the remaining digital representation represents only the exemplary three CD blank labels. Then, label layout dimensions are automatically measured from the remaining digital representation to determine the location on the sheet of each of the exemplary three blank labels. The method then creates a new page file representing the CD label sheet having the exemplary three blank labels thereon. The page file includes data as to the location on the sheet of each of the exemplary three blank labels.

In still another embodiment, computer readable media is provided for generating a page file representing a CD label sheet having at least one blank label thereon, such as an exemplary one blank label for a CD case and one blank label for a CD. The sheet may support these two exemplary blank labels at any of a plurality of locations on the sheet. The sheet with the two exemplary blank labels supported at a particular location defines a particular geometric layout configuration. The sheet may also have at least one image, for example, thereon in addition to the two exemplary labels. The exemplary two blank labels have the particular geometric layout configuration optically accented. The operations of the computer readable media begin by providing program instructions for receiving scanner output data resulting from scanning such optically accented particular geometric layout configuration. The scanner output data is a digital representation of the optically accented CD label sheet having the exemplary two blank labels thereon. Also, there are program instructions for excluding from the digital representation of the optically accented CD label sheet all of the images thereon so that the remaining digital representation represents only the exemplary two blank labels. Further program instructions analyze the remaining digital representation to determine the location on the sheet of each of the two exemplary blank labels; and then create a new page file representing the CD label sheet having the two exemplary blank labels thereon. The page file includes data as to the location on the sheet of each of the two blank labels. In still another embodiment, computer readable media is provided having program instructions for adding to a list of paper label templates a page file representing a new CD label sheet having at least one CD blank label thereon, for example, having a spline case blank label and a CD blank label. The operations of the computer readable media include program instructions for automatically analyzing the new CD label sheet to provide label sheet data representing the layout of the exemplary spline case blank label and CD blank label. Further program instructions generate a new, INI file. Then additional program instructions are provided for inserting the label sheet data into the new .INI file. There are also program instructions for appending the new .INI file to the list of paper label templates.

In still another embodiment, computer readable media is provided having program instructions for converting a digital representation to a page file. The digital representation represents a CD label sheet having at least one CD blank label and at least one image thereon in addition to the at least one CD blank label. For example, one spline blank label and one CD blank label may be on the CD label sheet with three groups of text as the images. The operations of the computer readable media may include program instructions for excluding from the digital representation of the CD label sheet all of the images thereon (e.g., the three groups of text) so that the remaining digital representation represents only the exemplary spline blank label and CD blank label. Also, program instructions are provided for measuring label layout dimensions from the remaining digital representation to determine the location on the sheet of each of the spline blank label and CD blank label. Then, program instructions create a new page file representing the CD label sheet having the spline blank label and the CD blank label, so that the page file includes data as to the location on the sheet of each of the spline blank label and the CD blank label.

Advantageously, using the above methods and computer readable media of the present invention, when the user buys CD label sheets for which the user's label printing software has no corresponding page file (i.e., the "new" CD label sheets), the user need not manually measure the locations of the blank labels that are on the purchased new CD label sheet to provide label location data. Rather, data generated by a scanner may be used by such method and computer readable media. Further, the user need not enter any label location data into a page file provided by the label printing software. Rather, the method and computer readable media of the present invention avoid these very time-consuming processes, and avoid the erroneous manual measurement and data entry operations. Additionally, absent the need to make such measurements very accurately, and the need to be very accurate in performing such data entry, the usefulness of such label printing software is enhanced, so that once again users will have an incentive to purchase such label printing software and new CD label sheets.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for methods and computer-readable media for automatically setting up page files for labels for CD media. It will be obvious, however, to one skilled in the art, that the present invention may be practiced without some or all of these specific details. In other instances, well known process operations have not been described in detail in order not to obscure the present invention.

Figure 1A:
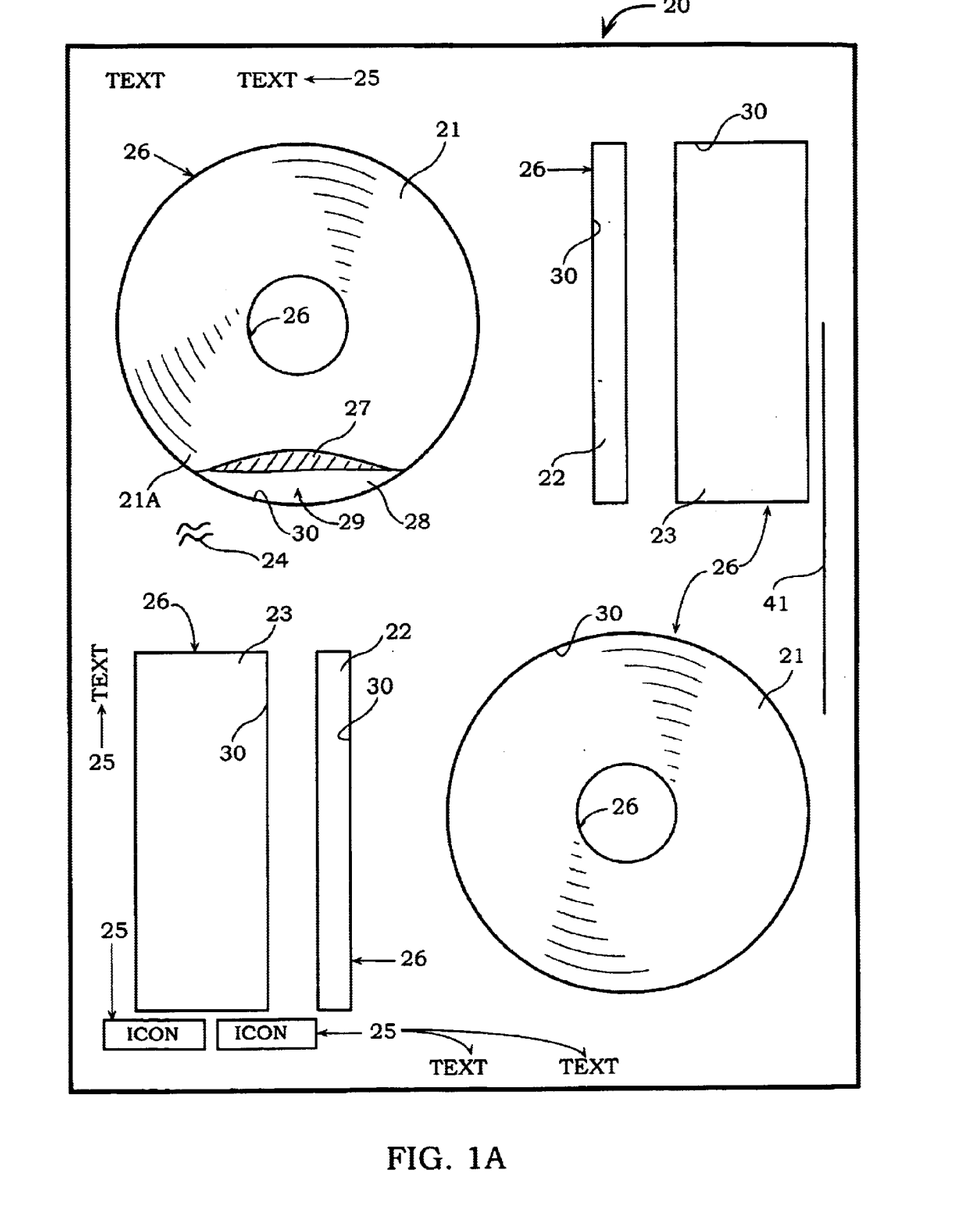
FIG. 1A is a schematic diagram of a CD label sheet, illustrating two CD blank labels, two spline blank labels, and two CD case blank labels, wherein the sheet is not represented in a page file of a user's label printing computer.

FIG. 1A is a schematic diagram of a CD label sheet 20, illustrating two CD blank labels 21, two spline blank labels 22, and two CD case blank labels 23, in accordance with one embodiment of the present invention. Such CD label sheets 20 may be two dimensional pieces of material that support one or more of the blank labels 21-23 and non-blank label areas 24 surrounding the blank labels 21-23. Such blank labels 21-23 are generally unprinted, i.e., they are blank (i.e., devoid of any marking) so that the user may provide custom text or designs to be printed or otherwise marked on the blank label 21-23. The blank labels 21-23 may be the spline blank label 22 to be printed on for providing information on the spline of a case (not shown); or may be the case blank label 23 to be inserted into a protective case (not shown) that is to contain and protect the CDs (not shown). As appropriate, information to be provided on the blank labels 21-23, such as on the CD case blank label 23, may describe the author of the CD, etc.; or on the CD blank label 21, may identify the CD(s) that are to be contained in the case; or on the spline blank label 22, may indicate the name of the CD.

A given piece of the material of a CD label sheet 20 may support the blank labels at any of various locations on the piece. The particular locations at which the various blank labels 21-23 are supported on a given piece of the material of the CD label sheet 20 are referred to as a "geometric layout configuration." As sold by a vendor to the user, each piece of material of a CD label sheet 20 may also have indicia 25 thereon, such as icons, printed logos or text, for example. Such vendor-provided indicia 25 are generally not printed by the manufacturer or the vendor within a perimeter 26 of the blank label 21-23. Thus, such vendor-provided indicia 25 may be referred to as "non-geometric configurations." Such vendor-provided indicia 25 are different from the blank labels 21-23 in that generally the user does not add any indicia to the original vendor-provided indicia 26.

The CD blank labels 21-23 that may be provided on the CD label sheets 20 are generally two dimensional blanks of adhesive-coated material. The label blanks 21-23 are removably supported on the CD label sheet 20. Referring to the CD blank label 21A, for example, which is shown partially turned up off the CD label sheet 20, an adhesive coating 27 on the back of the blank label 21A has a low tack with respect to a coating 28 of release material that is on a label-supporting face 29 of the CD label sheet 20. Thus, the blank label 21A is easily removable from the CD label sheet 20.

The blank labels 21-23 may have any one of various geometric shapes. For example, the CD blank label 21 is shown having a shape conforming to the shape of the interior of the CD, e.g., an annular shape. Also, the case blank label 22 is shown as having a rectangular shape, and the spline blank label 22 is shown as having a thin rectangular shape. The perimeter 26 of a particular blank label 21-23 defines the shape of the blank label 21-23, and may be defined by scoring 30 or another type of cut. The cut 30 separates the perimeter 26 of the particular blank label 21-23, and thus the entire blank label 21-23, from non-blank label areas 24, which are the remainder of the two dimensional piece of adhesive-coated material that is on the CD label sheet 20 and that is not used for the blank labels 21-23.

Figure 1B:
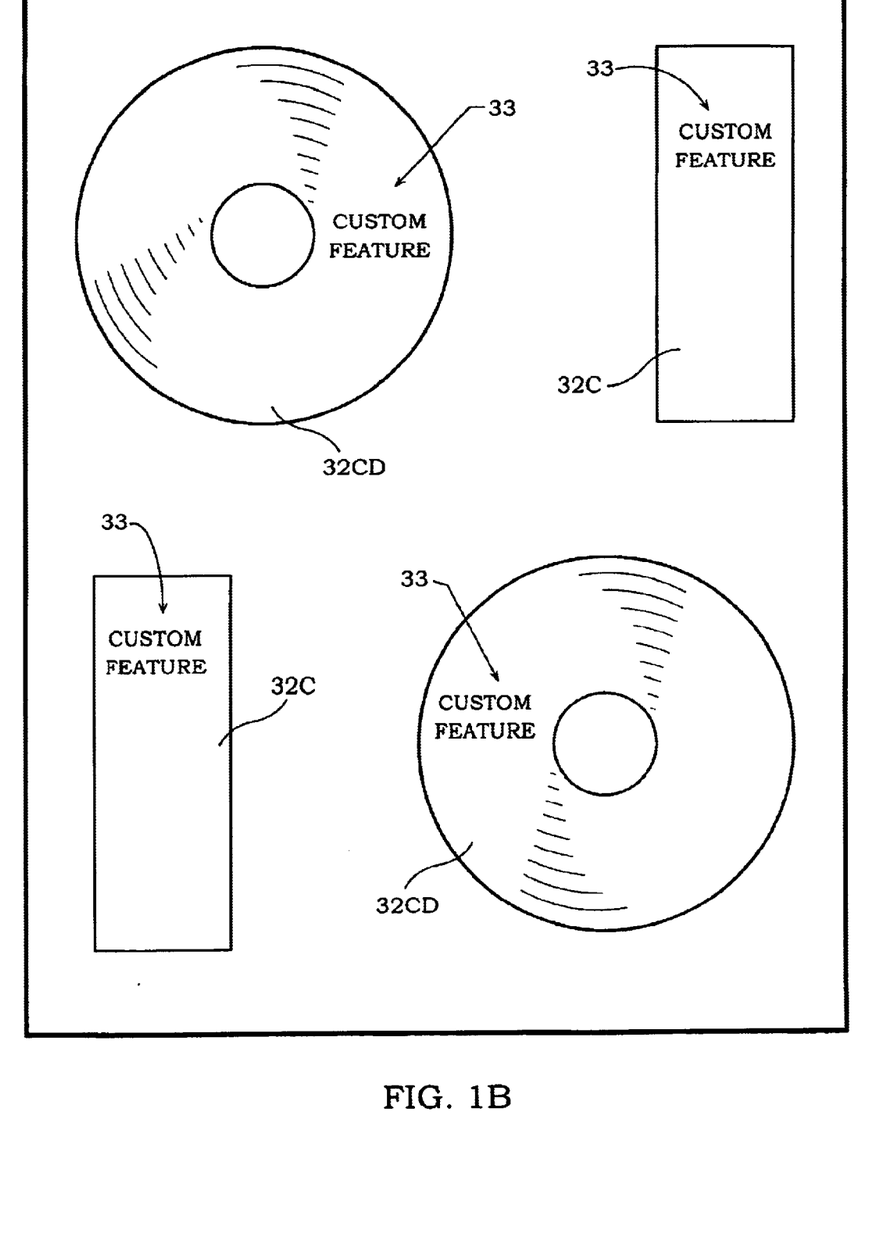
FIG. 1B is a schematic diagram of a CD label sheet after customization of the blank labels of such sheet to make custom labels, illustrating two custom CD labels and two custom CD case labels.

Each such blank label 21-23 is adapted to receive information in the form of printing media, such as printer toner. Such information may, for example, be customizing information selected by the user. FIG. 1B shows the respective blank labels 21 and 23 upon completion of the printing operation, for example, wherein the blank labels 21 and 23 are now referred to as labels, or customized labels, 32 having customized text or other markings thereon (referred to as "custom features" 33). A customized label 32CD is for a CD, and a customized label 32C is for a case, for example. It may be understood, then, that when a user makes custom CDs, and wishes to make customized labels 32 for such custom CDs, the user may purchase CD label sheets 20 of the type described with respect to FIG. 1A. Of course, the blank labels from different manufacturers will be oriented in different locations. If the user's label printing software has no page file corresponding to the just-purchased CD label sheets 20, the just-purchased CD label sheets 20 are referred to as "new" CD label sheets 20, and have a "new geometric layout configuration."

Figure 2:
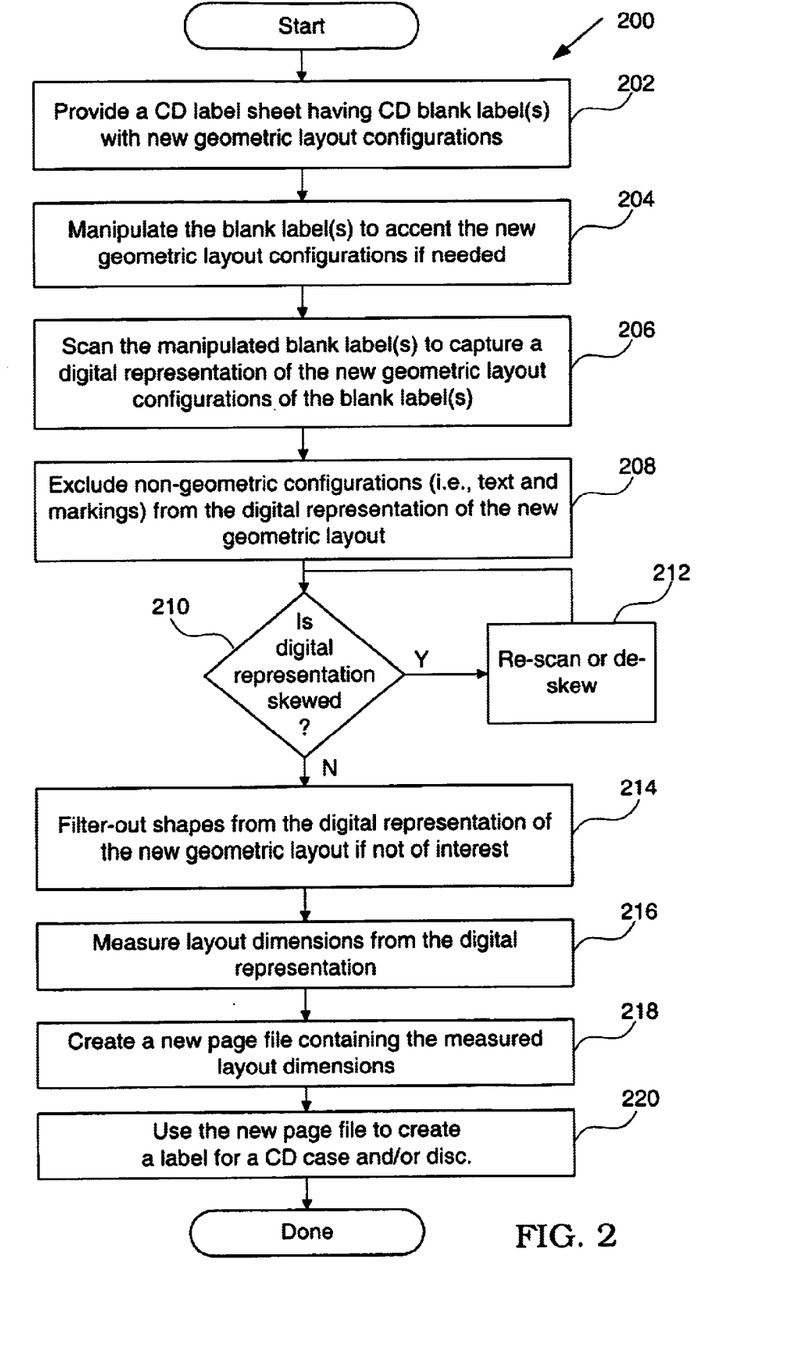
FIG. 2 illustrates a flowchart diagram detailing method operations of one embodiment of the present invention, performed when the CD label sheet is a new CD label sheet and a user desires to automatically set up a page file for printing onto blank labels of the new CD label sheet.

FIG. 2 illustrates a flowchart diagram detailing method operations of one embodiment of the present invention, performed when the CD label sheet 20 is a new CD label sheet 20 having a new geometric layout configuration, and a user desires to automatically set up a page file for printing onto the new CD label sheet 20. The method operations are performed by program instructions 200 which start and then in operation 202 provide one of the CD label sheets 20 described above. Such sheet 20 has one or more CD blank labels 21-23, and is a new CD label sheet 20 having a new geometric layout configuration as described above. In this situation, the user's label printing software has no page file corresponding to the new CD label sheet 20.

The method moves to operation 204 in which the blank labels 21-23 are manipulated to accent the new geometric layout configuration, if such accenting is needed to facilitate scanning of the CD label sheet 20 and the blank labels 21-23 thereon. Such manipulation may be performed, for example, by making a dark mark all along the perimeter 26 of each blank label 21–23. The dark mark, for example, provides contrast between each blank label 21–23 and the non-label areas 24 of the CD label sheet 20. Alternatively, to provide such contrast the blank label 21–23 may be pealed off, or other wise removed from, the CD label sheet 20. Partial peeling off is shown in FIG. 1A with respect to the CD blank label 21A at the top of the sheet 20. In these or similar manners, the perimeter 26 of each blank label 21–23 will be optically distinguishable from the non-label areas 24 to facilitate determining the location of each of the blank labels 21–23. The blank labels 21–23 that have been so manipulated are referred to as "manipulated blank labels."

The method then moves to operation 206 in which the manipulated blank labels 21–23 are scanned to capture a digital representation of the new geometric layout defined by the blank labels 21–23 on the new CD label sheet 20. The digital representation includes representations of the indicia 25 (the non-geometric configurations, e.g., text and icons), and representations of the blank labels 21–23 (including blank labels 21–23 that the user wishes to use as custom labels 32, i.e., those shown on FIG. 4A as desired blank labels 21DR and 23DR); and blank labels 21–23 (not shown on FIG. 4A) that the user does not wish to use as custom labels 32, i.e., those not of interest.

The method then moves to operation 208 in which the indicia 25 in the form of the non-geometric configurations, e.g., text and icons, are excluded from the digital representation of the new geometric layout configuration. After such exclusion and considering the exemplary desired blank labels 21DR and 23DR, the digital representation would include digital representations of the desired blank labels 21DR–23DR and of the blank labels 21–23 that are not of interest.

The method then moves to operation 210. It may be understood that in the scanning operation 206, the digital representation may represent a CD label sheet 20 that was fed into or placed in a scanner (not shown) out of alignment with an alignment axis 41 of the CD label sheet 20. As a result, the digital representation is skewed; or not properly aligned with, a scanning axis (not shown) of the scanner. Operation 210 makes a determination as to whether the digital representation resulting from operation 206 is skewed. If such digital representation is skewed, the method moves to operation 212 in which the user makes a determination as to whether the CD label sheet 20 that was scanned in operation 206 should be re-scanned or de-skewed. In either event, the method moves to operation 210 again, and a determination is made as to whether the digital representation resulting from operation 212 is skewed. Assuming this digital representation is not skewed, the method moves to operation 214; otherwise the method again moves to operation 212.

Figure 4A:
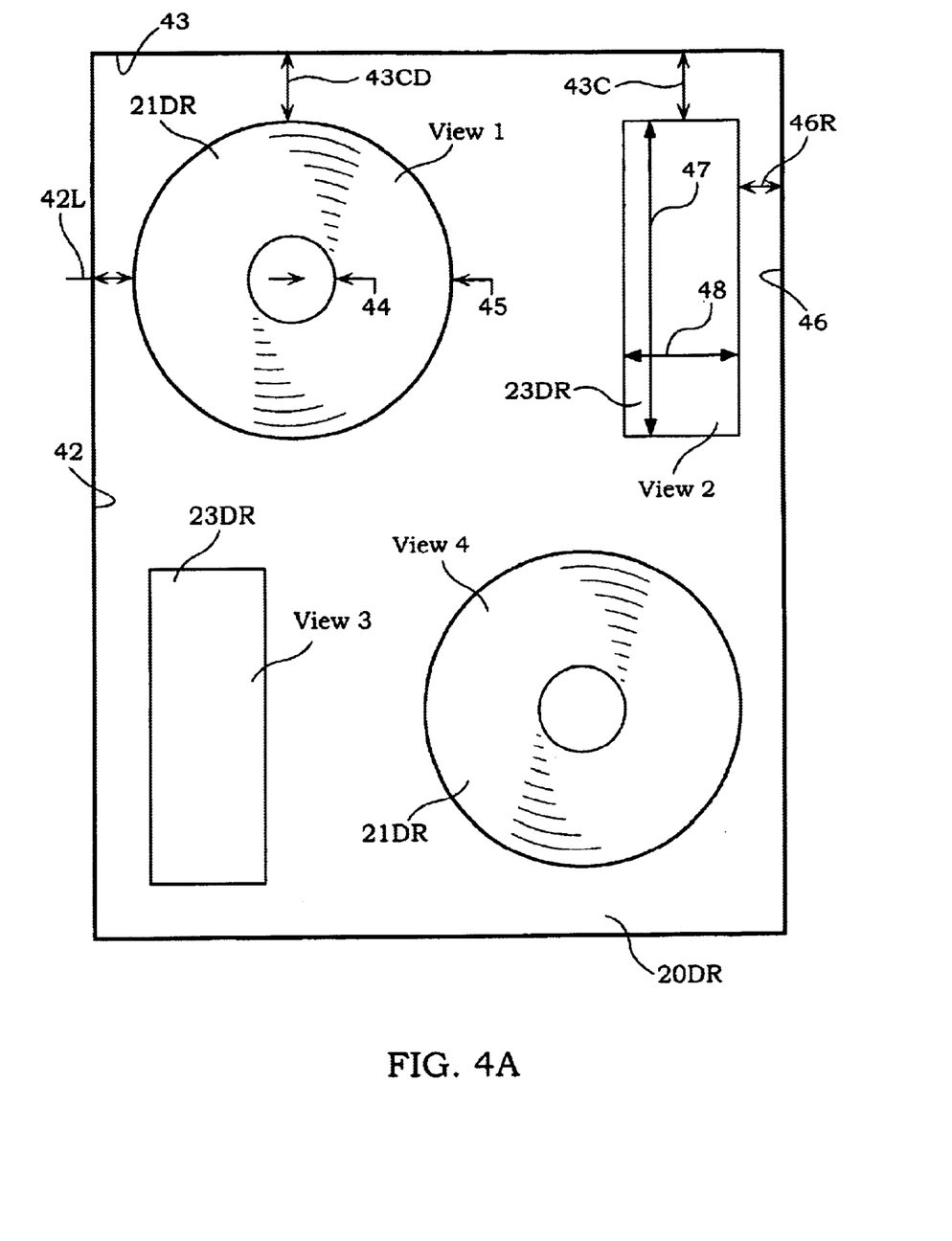
FIG. 4A is a schematic diagram of a digital representation of the new CD label sheet, illustrating the new label sheet after the operations of excluding non-geometric configurations and filtering out shapes not of interest, and illustrating dimensions of blank labels remaining on the new CD label sheet.

Operation 214 may be understood by comparing FIGS. 1A and 4A. It may be observed that the blank labels 21–23 in FIG. 1A include the two CD blank labels 21, the two spline blank labels 22, and the two CD case blank labels 23. Operation 214 is described using an exemplary decision that the two spline label blanks 22 are not of interest to the user, and should thus be filtered-out of the digital representation, which is done in operation 214. The digital representation after operation 214 is shown in schematic format in FIG. 4A as including a digital representation of the CD label sheet 20 (shown as 20DR) with only a digital representation of the two CD blank labels 21 (shown as 21DR) and of the two CD case blank labels (shown as 23 DR).

Still considering FIGS. 2 and 4A, the method moves to operation 216 in which layout dimensions are measured from the digital representation. In particular, measurements are made to determine the locations of the digital representations 21DR of the two CD blank labels 21 and the locations of the digital representations 23DR of the two CD case blank labels 23. Such measurements may be made in the following exemplary manner with respect to the digital representation 21DR of the one CD blank label 21 and to the digital representation 23DR of the one CD case blank label 23 shown at the top of the digital representation in FIG. 4A. Then, similar measurements may be made with respect to the digital representation 21DR of the one CD blank label 21 and the digital representation 23DR of the one CD case blank label 23 shown at the bottom of the digital representation in FIG. 4A.

For the digital representation 21DR of the annular-shaped CD blank label 21 at the top (identified as "View 1"), the offset 42L from a left edge 42 is measured, the offset 43CD from a top edge 43 is measured, and both an inner radius 44 and an outer radius 45 are measured. For the digital representation 23DR of the rectangular-shaped CD case blank label 23 at the top (identified as "View 2"), the offset 46R from a right edge 46 is measured, the offset 43C from the top edge 43 is measured, and both an X dimension offset 47 and a Y dimension offset 48 are measured. As noted, the measurements are also made for the respective digital representations 21DR and 23DR of the respective bottom two blank labels 21 and 23. The resulting measurement data may be referred to as the "measured layout dimensions."

Figure 4B:
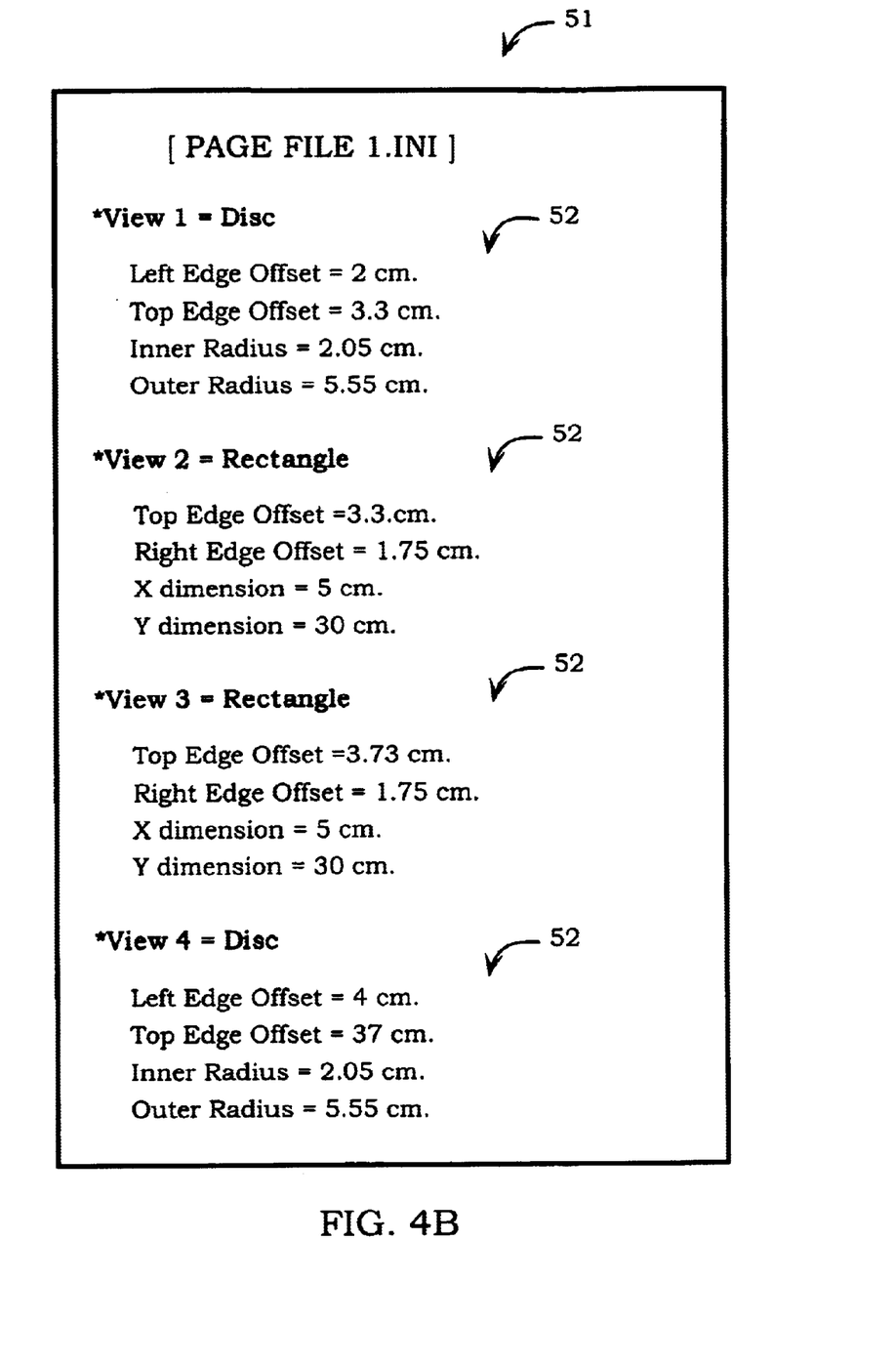
FIG. 4B illustrates a page file containing data corresponding to the digital representation described in FIG. 4A, in which views are rectangular-shaped and annular-shaped.

The method then moves to operation 218 in which a new page file 51 is created containing the measured layout dimensions. FIG. 4B illustrates the new page file 51, along with exemplary measurement data 52, e.g., the measured layout dimensions for each of Views 1, 2, 3, and 4 shown in the digital representations depicted in FIG. 4A.

The method then moves to operation 220 in which the new page file 51 is used to create a custom label 32, which in the exemplary situation described above, are two custom CD labels 32CD and two custom CD case labels 32C (FIG. 1B). To use the new page file the user selects "Page Setup" shown in FIG. 5A, and selects "MY LABEL" paper label template, by which the exemplary measurement data 52 entered into the new page file 51 (FIG. 4B) is accessed for processing. Having selected the MY LABEL paper label template, a miniature depiction 54 of the digital representation shown in FIG. 4A appears adjacent to the MY LABEL paper label template as a reminder to the user as to the subject matter of the selected CD label sheet 20. The user may then, for example, select text or other information, designs, etc., for use in making the two custom CD labels 32CD and the two custom CD case labels 32C. Upon selecting a print command and printing the selected text and/or other information and/or designs on the two blank CD blank labels 21 and on the two CD case blank labels 23, the method of making the custom CD labels 32CD and the custom CD case labels 32C is done.

Figure 3:
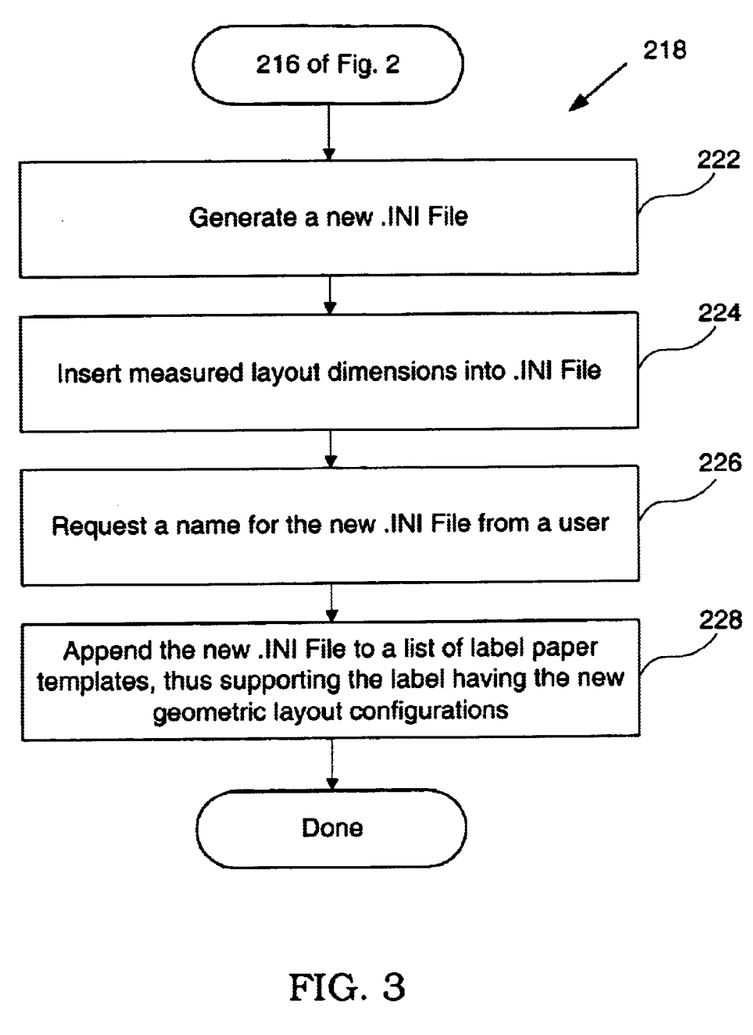
FIG. 3 illustrates a flowchart diagram detailing the operations of creation of a new page file in accordance with another embodiment of the present invention.

In FIG. 3, there are shown further operations of the method of automatically setting up a new page file 51 for printing onto the new CD label sheet 20. In particular, from operation 216 in FIG. 2 method suboperations within operation 218 may include operation 222 in which a new .INI File (i.e., the new page file 51) is generated. Then, in operation 224 measurement data (based on the measured layout dimensions from operation 216) are inserted into the .INI File 51. The method then moves to operation 226 in which a name for the new .INI File 51 is requested from the user.

Figure 5A:
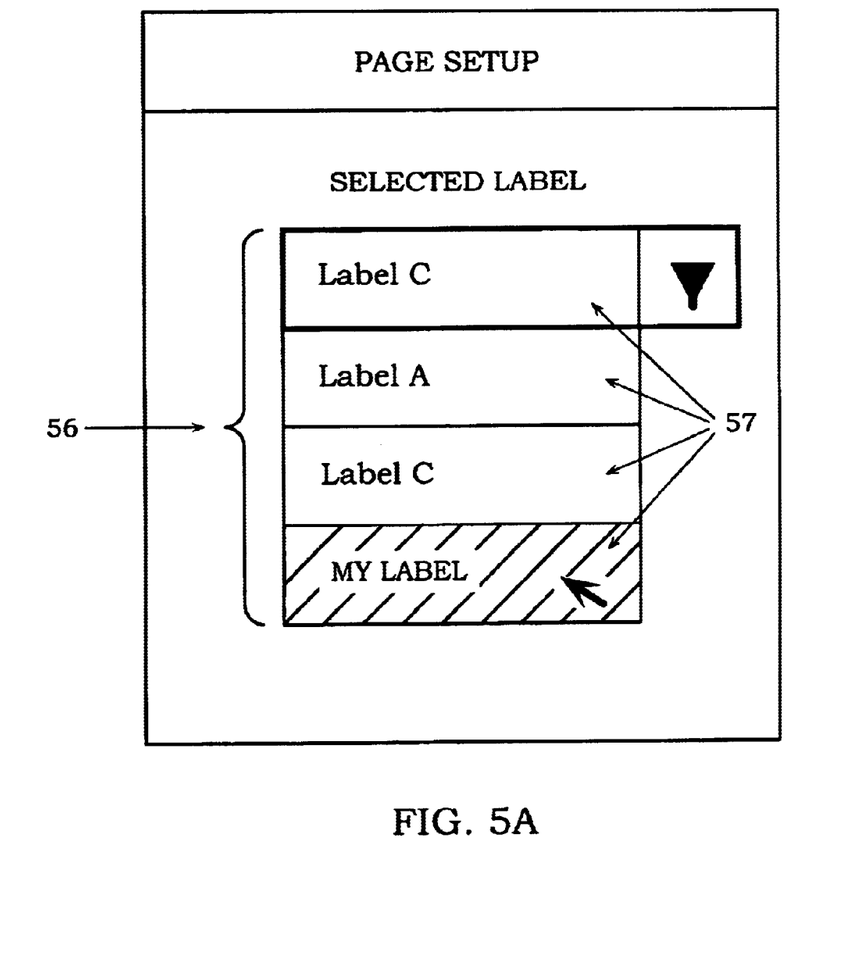
FIG. 5A illustrates a page setup pull-down screen, showing a new blank label, identified as "My Label", that has been prepared according to the present invention.
Figure 5B:
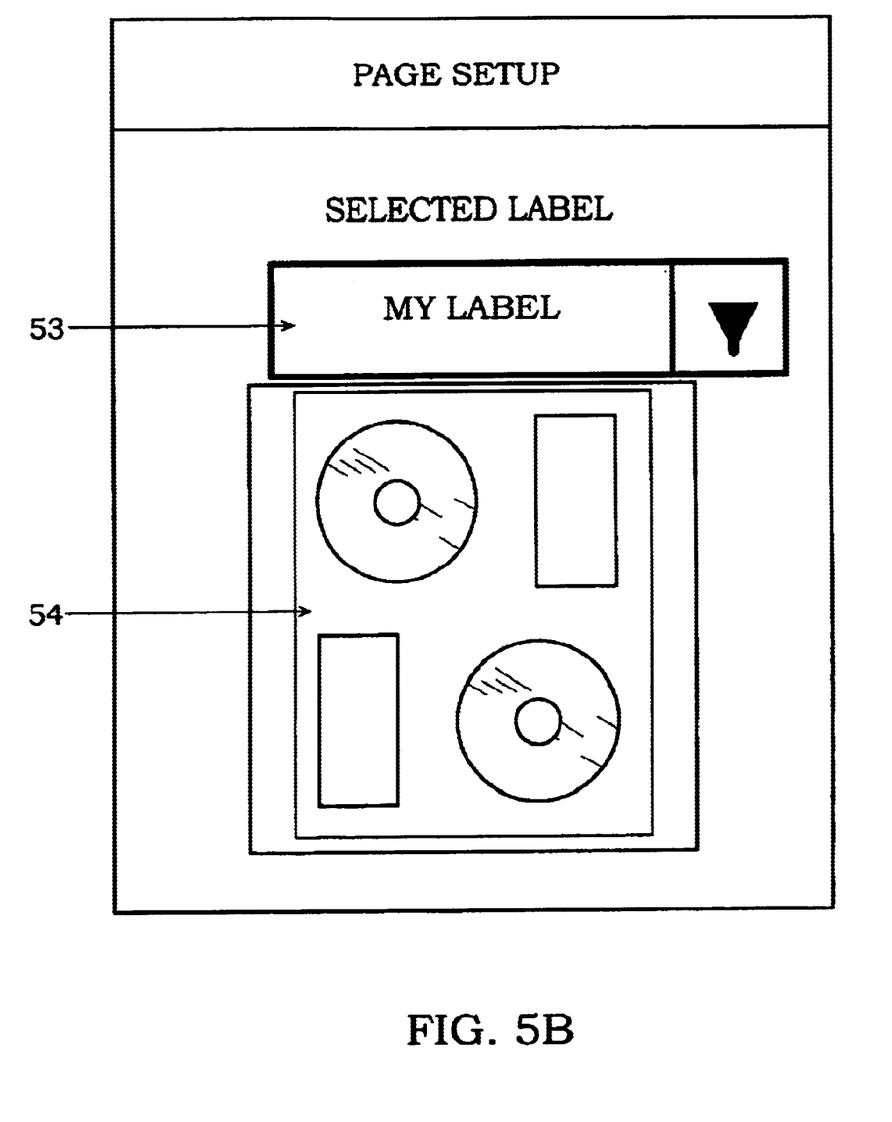
FIG. 5B illustrates a page setup pull-down screen, showing a new blank label, identified as "My Label", having been selected for use in printing a user's custom CD labels.

The user provides such new name, and the method moves to operation 228 in which the new name of the .INI File is appended to a list 56 of label paper templates 57, as shown in FIG. 5A. The sub-operations of operation 218 are thus done. In this manner, the customization of the blank labels 21–23 selected by the user is now supported. In other words, by appending the new .INI File 51 to the list 56 of label paper templates 57, the new labels 32 (having the new geometric layout configurations) are now supported.

Summarizing, such support enables the user to use the label printing software without vendor updates to cause the exemplary two custom CD labels 32CD and two custom CD case labels 32C to be printed without the above-described manual measurement-taking, and without the above-described manual data entry, even though the CD label sheet 20 corresponding to the two CD labels 21CD and the two case labels 23C to be printed was not available at the time the label printing software was last updated. In more detail, advantageously, using the above-described methods and computer readable media of the present invention, when the user buys CD label sheets 20 for which the user's label printing software has no corresponding page file 51 (i.e., when the user purchases the new CD label sheets 20), to provide label location or measurement data 52 the user need not manually measure the locations of the blank labels 21–23 that are on the purchased new CD label sheet 20. Rather, the digital representation generated by the noted scanner may be used by such method and computer readable media. Further, the user need not enter any label location measurement data 52 into the page file 51 provided by the user's label printing software. Rather, the method and computer readable media of the present invention avoid these very time-consuming processes, and avoid such possibly erroneous manual measurement and data entry operations. Additionally, absent the need to manually make such measurements very accurately, and absent the need to be very accurate in manually performing such data entry, the usefulness of the user's existing label printing software is enhanced, so that once again the user will have an incentive to purchase more new CD label sheets 20.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of generating a computer page file representing a compact disc label sheet having at least one label thereon for one or both of a compact disc case and a compact disc, the method comprising the operations of:

providing the compact disc label sheet having at least one of the labels thereon, wherein the sheet may support the at least one of the labels at any of a plurality of locations on the sheet, the sheet with the at least one of the labels supported at a particular location defining a particular geometric layout configuration for which the computer has no corresponding computer page file, the sheet having at least one image thereon in addition to the at least one label;

optically accenting the particular geometric layout configuration;

scanning the optically accented particular geometric layout configuration to generate a digital representation of the compact disc label sheet having the at least one of the labels thereon;

excluding from the digital representation of the compact disc label sheet all of the images thereon so that the remaining digital representation represents only the at least one of the labels;

analyzing the remaining digital representation to determine the location on the sheet of each of the at least one of the labels; and creating a new computer page file representing the compact disc label sheet having the at least one label thereon, the new computer page file including data as to the location on the sheet of each of the at least one of the labels.

2. A method according to claim 1, wherein the operation of optically accenting the particular geometric layout configuration is performed by removing the at least one label from the sheet.

3. A method according to claim 1, wherein the at least one label has a perimeter that defines the shape of the at least one label, and wherein the operation of optically accenting the particular geometric layout configuration is performed by marking the perimeter with a contrast media.

4. A method according to claim 1, wherein the at least one of the labels is a plurality of labels, and a user may select a first of the labels to be included in the file and identify a second of the labels to be excluded from the file, further comprising:

eliminating from the remaining digital representation the representation of the second label so that the remaining digital representation only represents the desired first label.

5. A method according to claim 1, wherein the compact disc label sheet has a central axis for scanning alignment, wherein the scanning operation may have been performed out of alignment with the central axis so that the digital representation is skewed; the method comprising the further operations of:

determining whether the digital representation is skewed; and if the digital representation is skewed, providing a choice to a user as to whether to perform the scanning operation again or to de-skew the digital representation.

6. A method according to claim 1, further comprising:

using the new page file to create a label for the one or both of the compact disc case and the compact disc.

7. A method of converting a digital representation to a computer page file, the digital representation representing a compact disc label sheet having at least one compact disc label and at least one image thereon in addition to the at least one compact disc label; the method comprising:

excluding from the digital representation of the compact disc label sheet all of the images thereon so that the remaining digital representation represents only the at least one of the labels;

measuring label layout dimensions from the remaining digital representation to determine the location on the sheet of each of the at least one of the labels; and creating a new computer page file representing the compact disc label sheet having the at least one label thereon, the new computer page file including data as to the location on the sheet of each of the at least one of the labels.

8. A method according to claim 7, wherein the digital representation may be a first digital representation produced by a scanning operation that was out of alignment with an alignment axis of the label sheet such that the first digital representation is skewed; the method comprising the further operations of:

prior to the measuring operation, determining whether the digital representation is skewed; and if the digital representation is skewed, providing a choice to a user as to whether to perform the scanning operation again or to de-skew the first digital representation.

9. A method according to claim 8, the method comprising the further operations of:

according to the choice of the user, either performing the excluding, measuring and creating operations with respect to a digital representation resulting from performing the scanning operation again, or de-skewing the first digital representation.

10. A method according to claim 7, wherein the compact disc label sheet has one or both of a label for a compact disc case and a label for a compact disc, further comprising using the new page file to create a label for the one or both of the compact disc case and the compact disc.

11. A computer readable media having program instructions for generating a computer page file representing a compact disc label sheet having at least one label thereon for one or both of a compact disc case and a compact disc, wherein the sheet may support the at least one of the labels at any of a plurality of locations on the sheet, the sheet with the at least one of the labels supported at a particular location defining a particular geometric layout configuration for which the computer has no corresponding computer page file, the sheet having at least one image thereon in addition to the at least one label, the at least one of the labels having the particular geometric layout configuration optically accented, the operations of the computer readable media comprising:

program instructions for receiving data resulting from scanning the optically accented particular geometric configuration, the data being a digital representation of the optically accented compact disc label sheet having the at least one of the labels thereon;

program instructions for excluding from the digital representation of the optically accented compact disc label sheet all of the images thereon so that the remaining digital representation represents only the at least one of the labels;

program instructions for analyzing the remaining digital representation to determine the location on the sheet of each of the at least one of the labels; and program instructions for creating a new computer page file representing the compact disc label sheet having the at least one label thereon, the new computer page file including data as to the location on the sheet of each of the at least one of the labels.

12. A computer readable media having program instructions for converting a digital representation to a computer page file, the digital representation representing a compact disc label sheet having at least one compact disc blank label and at least one image thereon in addition to the at least one compact disc blank label; the operations of the computer readable media comprising:

program instructions for excluding from the digital representation of the compact disc label sheet all of the images thereon so that the remaining digital representation represents only the at least one of the blank labels;

program instructions for measuring label layout dimensions from the remaining digital representation to determine the location on the sheet of each of the at least one of the labels; and program instructions for creating a new computer page file representing the compact disc label sheet having the at least one blank label thereon, the new computer page file including data as to the location on the sheet of each of the at least one of the blank labels.

\* \* \* \* \*